United States Patent [19]

Okuda et al.

[11] 4,380,934
[45] Apr. 26, 1983

[54] GASEOUS FLUID FLOW METER UTILIZING KARMAN VORTEX STREET

[75] Inventors: Kuniteru Okuda; Teruki Fukami, both of Tokyo; Yoshiaki Asayama, Himeji; Shunichi Wada, Himeji; Masami Kabuto, Himeji, all of Japan

[73] Assignees: Oval Engineering Co., Ltd.; Mitsubishi Denki Kabushiki Kaisha, both of Tokyo, Japan

[21] Appl. No.: 218,743

[22] Filed: Dec. 22, 1980

Related U.S. Application Data

[63] Continuation-in-part of Ser. No. 956,599, Oct. 30, 1978, abandoned.

[30] Foreign Application Priority Data

| Nov. 4, 1977 | [JP] | Japan | 52-148024 |
| Jun. 12, 1978 | [JP] | Japan | 53-80067 |
| Sep. 7, 1978 | [JP] | Japan | 53-123314 |
| Sep. 20, 1978 | [JP] | Japan | 53-129325 |

[51] Int. Cl.³ .............................................. G01F 1/32
[52] U.S. Cl. ....................................................... 73/861.23
[58] Field of Search ................. 73/861.22, 861.23, 202; 310/322

[56] References Cited

U.S. PATENT DOCUMENTS

| 3,675,053 | 7/1972 | Mifune | 310/322 |
| 3,751,979 | 8/1973 | Ims | 73/861.23 |
| 3,818,877 | 6/1974 | Barrera et al. | 73/861.23 |
| 3,965,730 | 6/1976 | Innes | 73/861.23 |
| 4,031,757 | 6/1977 | Colton | 73/861.23 |
| 4,041,757 | 8/1977 | Baker et al. | 73/202 |

Primary Examiner—Herbert Goldstein
Attorney, Agent, or Firm—Wenderoth, Lind & Ponack

[57] ABSTRACT

A gaseous fluid flow meter utilizing a Karman vortex street has a conduit having opposed flat walls and through which a gaseous fluid to be measured flows, a vortex generating member disposed perpendicularly to the direction of flow of the fluid to generate the Karman vortex street downstream thereof, a vortex detector disposed on the conduit and having a transmitter in one flat wall for transmitting a continuous ultrasonic wave across the Karman vortex street and a receiver in the other flat wall positioned opposite the ultrasonic wave transmitter in a direction perpendicular to the direction of the flow of the gaseous fluid through the conduit for receiving the continuous ultrasonic wave to detect the changes in phase of the ultrasonic wave indicating the number of vortices of the Karman vortex street generated in a unit time, and a sound absorbing material on only the portion of the inner surfaces of the flat walls of the conduit around the transmitter and around the receiver and extending sufficiently far along the walls from the transmitter and receiver for preventing the generation of standing waves in front of the walls due to the reflection of the ultrasonic wave.

5 Claims, 6 Drawing Figures

GASEOUS FLUID FLOW METER UTILIZING KARMAN VORTEX STREET

This application is a continuation-in-part of application Ser. No. 956,599, filed Oct. 30, 1978 now abandoned.

BACKGROUND OF THE INVENTION

This invention relates to a gaseous fluid flow meter utilizing a Karman vortex street.

Gas flow meters utilizing the Karman vortex street include a vortex generating rod immersed in a gaseous fluid flowing through a conduit perpendicularly to the direction of flow of the fluid to generate the Karman vortex street downstream of the rod and employ an ultrasonic wave to detect the Karman vortex street thereby to measure a flow rate of the gaseous fluid. In order to detect the Karman vortex street, it has been proposed to dispose an ultrasonic transmitter and an ultrasonic receiver in opposed relationship in the conduit through which a measured gaseous fluid flows so that an ultrasonic wave transmitted from the ultrasonic transmitter is modulated by the vortices of the Karman vortex street and then received by the ultrasonic receiver. The ultrasonic wave is continuously transmitted to the receiving side and the modulation is a change in phase of the ultrasonic wave due to vortices is first sensed. Such a system is, on the one hand, advantageous in that when the energy of the ultrasonic wave is increased, the output from the receiving side becomes high and influence of multi reflection and diffused reflections within the conduit can be fully disregarded. On the other hand, the arrangement is disadvantageous in that a standing wave is generated between the opposed transmitting and receiving elements due to resonance, and this standing wave has a node coinciding with the position where the receiving element is mounted. This affects the change in phase due to the effect of the vortices, which in turn makes the sensing of an accurate flow rate difficult or impossible. Particularly, when the flow rate of air is being measured, the ultrasonic wave is propagated through the air at a propagation velocity which changes with a change in the air temperature. If the ultrasonic wave being used has a constant frequency, then this change in propagation velocity is attended by a variation in the wave length thereof. This has resulted in the disadvantage that a standing ultrasonic wave is formed at a certain temperature of the air which causes the ultrasonic receiver not to receive in a normal fashion the ultrasonic wave transmitted from the ultrasonic transmitter.

OBJECT AND BRIEF SUMMARY OF THE INVENTION

Accordingly, it is an object of the present invention to provide a new and improved flow meter utilizing a Karman vortex street to measure the flow rate of a gaseous fluid over a wide range and at temperatures extending from a low to an elevated temperature.

To sense accurately the vortices in the fluid flow, sound absorbing material for absorbing the resonance energy is provided only on the opposite portions of the inner surface of the duct around the transmitting and receiving elements, thereby to extinguish only the standing wave and the node.

The present invention provides a flow meter utilizing a Karman vortex street and comprising a conduit having a measured gaseous fluid flowing therethrough, a vortex generation member disposed perpendicularly to the direction of flow of the fluid within the conduit to generate a Karman vortex street downstream thereof, a vortex detector disposed in the conduit and utilizing an ultrasonic wave to detect the number of vortices of the Karman vortex street generated in a unit time, and a sound absorbing material for absorbing and attenuating the ultrasonic wave on the inner wall of the conduit only around the receiver and around the position of the transmitter and extending a predetermined distance therefrom.

BRIEF DESCRIPTION OF THE DRAWINGS

The present invention will become more readily apparent from the following detailed description taken in conjunction with the accompanying drawings in which.

Throughout the figures like reference numerals designate the identical or corresponding components.

DESCRIPTION OF THE PREFERRED EMBODIMENTS

Figure 1:
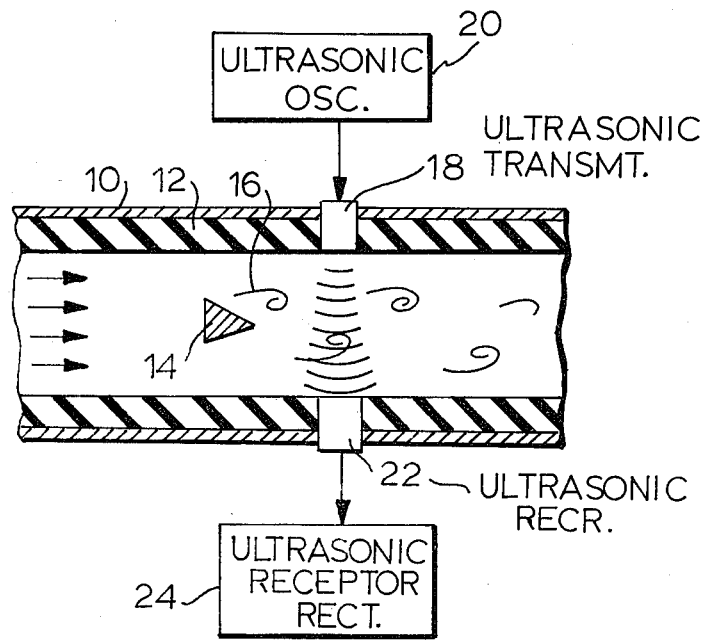
FIG. 1 is a fragmental longitudinal sectional view of one embodiment of a flow meter according to the present invention with some parts illustrated in block form.

Referring now to FIG. 1 of the drawings, there is illustrated one embodiment of a flow meter of the present invention utilizing a Karman vortex street. The arrangement comprises a conduit 10, having opposed flat walls, and a vortex generating rod 14 fixedly secured in the conduit perpendicularly to the direction of flow of the gaseous fluid within the conduit 10. In the illustrated embodiment the rod has a triangular cross-section with one side of the regular triangle located at right angles to the direction of flow of the gaseous fluid upstream of the longitudinal axis of the rod 14. Thereby the vortex generating rod 14 generates a Karman vortex street 16 downstream thereof.

The conduit preferably has a rectangular cross-section having a ratio of height to breadth of 1 to 2. The breadth L of the conduit can be determined from the base triangular rod. The triangular rod having a base of a dimension d generates, downstream thereof a Karman vortex street including two parallel arrays of vortices at a pitch of l and a spacing h between the two parallel arrays. Since $h/d \approx 1.2 \sim 1.3$ and $h/l = 0.281$ are theoretically known, the pitch l is calculated to be equal to $(4.27 \sim 4.62)d$ by dividing $h/d$ by $h/l$. Also breadth $L \geq l$ must hold. Therefore the breadth of the conduit can be determined by the base d of the triangular rod. A typical conduit can be determined by the base d of the triangular rod. A typical conduit is $26 \times 52$ mm with a rod with a base of 0.91 mm. The rod may be of a circular cross-section. In the latter case the dimension d designates the diameter of the rod.

An ultrasonic transmitter 18 is disposed on the conduit 10 immediately downstream of the vortex generating rod 14 so that the ultrasonic transmitting surface thereof is slightly outwardly of the inner surface of the wall of the conduit 10. The transmitter 18 is connected to an ultrasonic oscillator 20 and a continuous ultrasonic wave is transmitted therefrom. Preferably the power of the transmitter is from several to tens of milliwatts. An ultrasonic receiver 24 is disposed on the conduit 10 directly opposite to the ultrasonic transmitter 18 with the ultrasonic receiving surface thereof similarly projecting slightly from the inner surface of the conduit 10. The receiver 22 is connected to an ultrasonic receptor 24.

Figure 2:
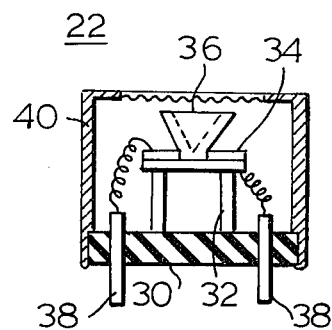
FIG. 2 is a cross-sectional view of the ultrasonic receiver shown in FIG. 1.

The ultrasonic receiver 22 preferably has the structure shown in FIG. 2. As shown in FIG. 2, the ultrasonic receiver 22 comprises an electrically insulating base plate 30, a plurality of supporting rods 32 (only two of which are illustrated) formed of a resilient material such as rubber and mounted on the base plate 30 and a bimorph type ultrasonic vibrator 34 supported to the supporting rods 32. A hollow inverted cone 36 is connected at the apex to the ultrasonic wave-receiving surface of the ultrasonic vibrator 34. The cone 36 forms a resonator for the ultrasonic wave involved and serves as a combined deflecting and reflecting member. The vibrator 34 is electrically connected to the ultrasonic receptor 24 (see FIG. 1) through a pair of electrodes 38 sealed in and extending through the base plate 30.

The assembly formed as above described in surrounded by a housing 40 and the base plate 30 is connected in sealed relationship to the open end of the housing 42 for completing the ultrasonic receiver 22. The resonator 36 has the larger diameter end facing an ultrasonic wave-receiving surface disposed on the other or closed end of the housing 42.

When the ultrasonic transmitter 18 operates to transmit a continuous ultrasonic wave, particularly when the energy thereof is high, because the receiver 22 is directly opposite the transmitter, reflections will occur and resonance takes place, resulting in the setting up of a standing wave with a node coinciding with the position of the receiver 22. Such a standing wave with the node positioned to coincide with the receiver will substantially prevent detection of any phase change of the transmitted ultrasonic wave due to the passage therethrough of the vortices 16. In order to prevent the formation of the standing wave, the area of the inner wall of the conduit 10 around the transmitter and around the receiver is lined with a sound absorbing material 12 formed for example of unwoven cloth, preferably of polyester fiber. The thickness of the sound absorbing material 12 may preferably be 0.8 mm and is such that it surrounds the portions of the transmitter 18 and receiver 22 projecting from the inner surface of the wall of the conduit 10, so that the transmitting and receiving surfaces of the transmitter and receiver are flush with the inner surface of the sound absorbing material 12. It is not necessary to cover the entire inner surface of the conduit 10 with the sound absorbing material. It is sufficient to cover only the area around the transmitting and receiving surfaces of the transmitter and receiver, respectively. The sound absorbing material need extend only 150 mm upstream and 50 mm downstream from the respective transmitting and receiving surfaces.

In order for the sound absorbing material to absorb the sound, the product of the density $\rho$ of the gaseous fluid flowing in the conduit 10 and the velocity $C$ of the sound through the fluid must equal the product of the density $\rho'$ of the sound absorbing material and the velocity $C'$ of sound through the sound absorbing material, i.e. $\rho \times C = \rho' \times C'$. For a gaseous fluid, such as air, the product of the density of the gaseous fluid and the velocity of sound therethrough is in the range of 40–43 microbars/cm/sec. The sound absorbing material should therefore be a material which is porous, such as unwoven cloth, foamed polyethlyene or the like.

In operation the measured gaseous fluid, for example, air, flows through the interior of the conduit 10 in the direction of the arrow shown in FIG. 1 and the vortex generating rod 14 partly obstructs the flowing fluid to generate the Karman vortex street 16 downstream thereof. On the other hand, the ultrasonic transmitter 18 driven by the ultrasonic transmitter 18 driven by the ultrasonic oscillator 20 transmits a continuous ultrasonic wave through the flowing gaseous fluid perpendicularly to the direction of the flow of the fluid and toward the ultrasonic receiver 22. While the ultrasonic wave is propagated through the flowing fluid it is modulated by the vortices of the Karman vortex street to change the phase of the ultrasonic wave and then the modulations in the ultrasonic wave received by the ultrasonic receiver 22 are detected and converted to a corresponding electrical signal. This electrical signal is applied to the ultrasonic receptor 24. The ultrasonic receptor 24 detects the number of vortices of the Karman vortex street generated in a unit time thereby to measure the flow rate of the gaseous fluid in the manner well known in the art.

As above described, the continuous ultrasonic wave emitted from the ultrasonic transmitter 18 propagates through the flowing gaseous fluid while being directed thereinto. Accordingly, the ultrasonic wave reaches, in addition to the receiving surface of the ultrasonic receiver 22, that portion of the inner surface of the wall of the conduit 10 located adjacent to the receiver 22. However, since that inner wall surface is covered with the sound absorbing material 12, it does not reflect the ultrasonic wave. As a result, no standing wave is formed and a stable measurement can be made without being affected by reflected ultrasonic waves and a standing ultrasonic wave.

It will be readily be understood that the sound absorbing material 12 is required only to be applied to that portion of the inside of the conduit 10 extending sufficiently far from the receiving surface of the receiver 22 to extinguish the standing wave. Preferably the material extends about 150 mm upstream and 50 mm downstream of the receiver.

The provision of the sound absorbing material around the transmitter 18 is to insure that no standing wave is produced by any reflected waves. Again, the sound absorbing material need extend no farther from the transmitter 18 than is sufficient to extinguish any standing wave.

Figure 3:
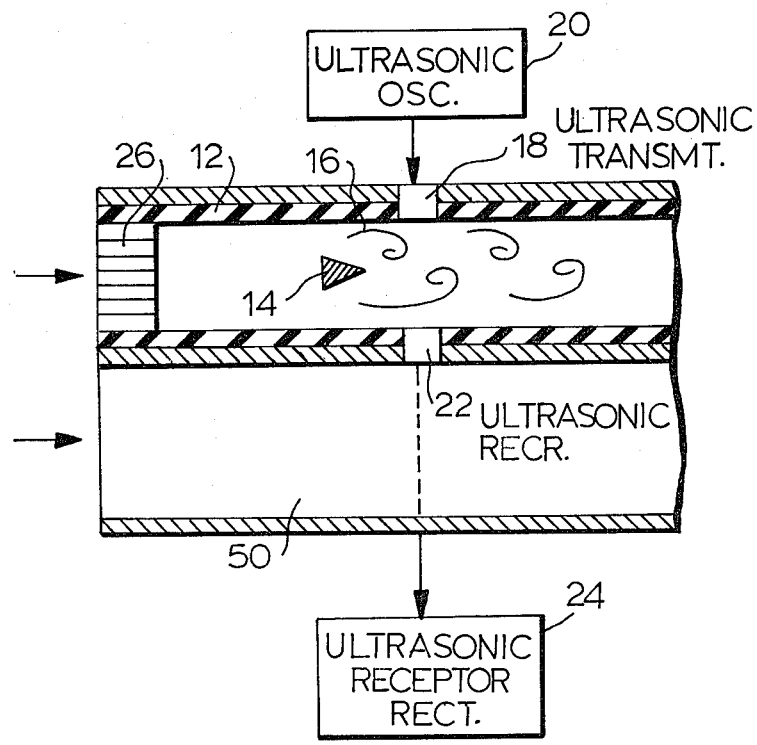
FIG. 3 is a view similar to FIG. 1 but illustrating a modification of the flow meter of the present invention.
Figure 4:
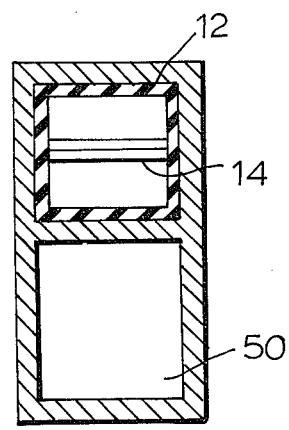
FIG. 4 is a cross-sectional view of the arrangement shown in FIG. 3.

The arrangement illustrated in FIGS. 3 and 4 comprise a conduit with a rectangular cross-sectional profile divided into a pair of parallel conduit portions 10 and 50. Only the conduit portion 10 includes the components 12, 14, 18, 20 and 22 as shown in FIG. 1 with a laminar flow producing means in the form of a rectifier 26 being disposed at the inlet thereof.

The flow rate of the gaseous fluid flowing through the conduit portion 10 is measured in the manner as above described in conjunction with FIG. 1 and the overall flow rate of the fluid flowing through both conduit portions 10 and 50 can be determined by the measured flow rate.

The arrangement shown in FIGS. 3 and 4 is advantageous over that shown in FIG. 1 in that in FIGS. 3 and 4 the distance between the ultrasonic transmitter and receiver 18 and 22 can be reduced to permit the use of a low power ultrasonic wave. Further the amount of sound absorbing material 12 can be reduced because of a decrease in area over which the particular ultrasonic wave reaches the inner wall surface of the conduit portion 10.

If desired, the conduit may be divided into more than two conduit portions only one of which is constructed substantially as illustrated in FIG. 1.

Figure 5:
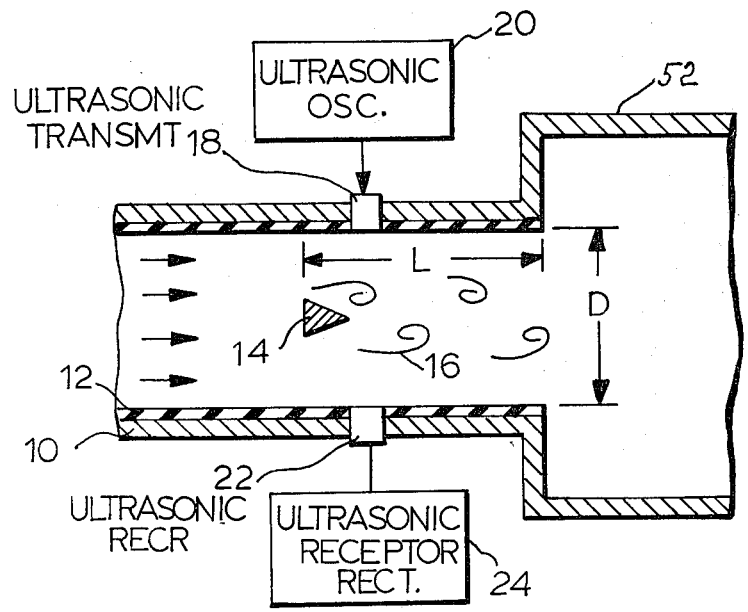
FIG. 5 is a view similar to FIG. 1 but illustrating another modification of the flow meter of the present invention.

The arrangement illustrated in FIG. 5 is different from that shown in FIG. 1 only in that, in FIG. 5, the conduit 10 is connected at the downstream end to an expanded pipe 52 having a transverse dimension greater than that of the conduit 10.

The conduit 10 has previously been required to include a portion in the form of a straight pipe extending downstream of the vortex generating rod 14 a distance L (see FIG. 5) equal to at least five times the transverse dimension D thereof (see FIG. 5). In the arrangement of FIG. 5, however, this length L can be equal to or smaller than twice the transverse dimension D. This results in a decrease in the overall dimension of the resulting flow meter.

In the arrangement of FIG. 5 it is seen that the ultrasonic wave from the transmitter 18 may reach the inner wall of the expanded pipe 52. It has been found, however, that the ultrasonic wave reflected from the inner wall of the expanded pipe 52 almost completely decays after it enters into the conduit 10 and before it reaches the ultrasonic receiver 22. As a result, the expanded pipe 52 does not adversely affect the measurement of the flow rate.

Figure 6:
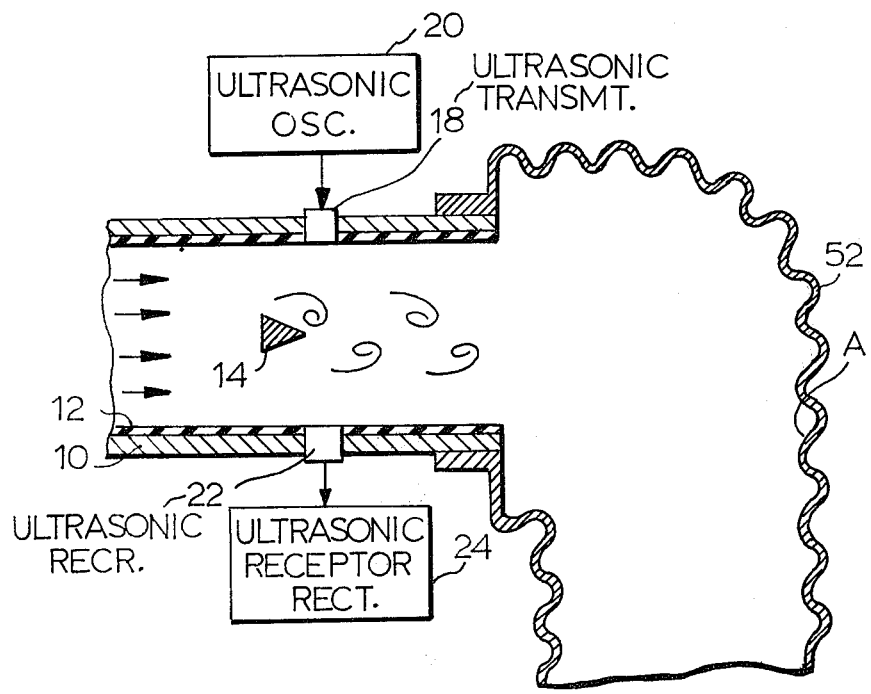
FIG. 6 is a view similar to FIG. 1 but illustrating a modification of the arrangement shown in FIG. 5.

If it is desired to bend the expanded pipe 52 downstream of the straight portion of the conduit 10 then the bent portion thereof can have the inner wall irregularly corrugated as shown by the reference character A in FIG. 6. The irregularly corrugated walls 56 diffusely reflect the ultrasonic wave incident thereupon to prevent the ultrasonic wave reflected from the inner wall of the expanded pipe 52 from directly reaching the ultrasonic receiver 20.

From the foregoing it is seen that the present invention provides a flow meter utilizing the Karman vortex street which prevents a transmitted ultrasonic wave from reflecting from an inner wall of a conduit containing the flow being measured and therefore prevents a standing ultrasonic wave from being formed within the conduit due to the reflection of the ultrasonic wave.

Further the ultrasonic receiver shown in FIG. 2 is advantageous in that the inverted cone-shaped resonator is operable to diffuse and reflect the ultrasonic wave from the transmitter reaching the same but not directly toward the transmitter thereby preventing a standing ultrasonic wave from being formed due to the ultrasonic wave from the transmitter interferring with that reflected from the inverted cone-shaped resonator.

Therefore it is seen that the inverted cone-shaped resonator 36 cooperates with the sound absorbing material 12 to permit a more accurate measurement of the flow rate.

While the present invention has been illustrated and described in conjunction with a few preferred embodiments thereof it is to be understood that numerous changes and modifications may be resorted to without departing from the spirit and scope of the present invention. For example, the conduit may be formed of the sound absorbing material as above described. Also the resonator 36 is not required to be in the form of a hollow inverted-cone and it may be irregularly corrugated or wedge-shaped so as to reflect diffusely the ultrasonic wave falling thereon. Further a net of suitable meshes may be disposed in front of both the ultrasonic transmitter and receiver and the hollow inverted cone-shaped resonator can be omitted.

What is claimed is:

1. A gaseous fluid flow meter utilizing a Karman vortex street and comprising a conduit having opposed flat walls and through which a gaseous fluid to be measured flows, a vortex generating member disposed perpendicularly to the direction of flow of the fluid to generate the Karman vortex street downstream thereof, a vortex detector disposed on the conduit and having means in one flat wall for transmitting a continuous ultrasonic wave across the Karman vortex street and means in the other flat wall positioned opposite said ultrasonic wave transmitting means in a direction perpendicular to the direction of the flow of the gaseous fluid through said conduit for receiving the continuous ultrasonic wave to detect the changes in phase of the ultrasonic wave indicating the number of vortices of the Karman vortex street generated in a unit time, a sound absorbing material on only the portion of the inner surfaces of the flat walls of said conduit around said transmitting means and around said receiving means and extending sufficiently far along said walls from said means for preventing the generation of standing waves in front of said walls due to the reflection of the said ultrasonic wave, and said conduit having a straight section extending downstream of said vortex detector and an expanded section connected to said straight section and having a larger inside diameter than said straight section, said straight section having a length no greater than twice the inside dimension of said conduit.

2. A gaseous fluid flow meter utilizing a Karman vortex street and comprising a conduit having opposed flat walls and through which a gaseous fluid to be measured flows, a vortex generating member disposed perpendicularly to the direction of flow of the fluid to generate the Karman vortex street downstream thereof, a vortex detector disposed on the conduit and having means in one flat wall for transmitting a continuous ultrasonic wave across the Karman vortex street and means in the other flat wall positioned opposite said ultrasonic wave transmitting means in a direction perpendicular to the direction of the flow of the gaseous fluid through said conduit for receiving the continuous ultrasonic wave to detect the changes in phase of the ultrasonic wave indicating the number of vortices of the Karman vortex street generated in a unit time, a sound absorbing material on only the portion of the inner surfaces of the flat walls of said conduit around said transmitting means and around said receiving means and extending sufficiently far along said walls from said means for preventing the generation of standing waves in front of said walls due to the reflection of the said ultrasonic wave, said conduit having a straight section extending downstream of said vortex detector and an expanded section connected to said straight section and having a larger inside diameter than said straight section, and said expanded section having an inner wall which is corrugated.

3. A flow meter as claimed in claim 2 wherein said expanded section is curved.

4. A gaseous fluid flow meter utilizing a Karman vortex street and comprising a conduit having opposed flat walls and through which a gaseous fluid to be measured flows, a vortex generating member disposed perpendicularly to the direction of flow of the fluid to generate the Karman vortex street downstream thereof, a vortex detector disposed on the conduit and having means in one flat wall for transmitting a continuous ultrasonic wave across the Karman vortex street and means in the other flat wall positioned opposite said ultrasonic wave transmitting means in a direction perpendicular to the direction of the flow of the gaseous fluid through said conduit for receiving the continuous ultrasonic wave to detect the changes in phase of the ultrasonic wave indicating the number of vortices of the Karman vortex street generated in a unit time, said vortex detector further having a deflecting reflector in said conduit positioned between said ultrasonic transmitter and receiver to receive the ultrasonic waves from said transmitter and transmit them to said receiver and for reflecting said ultrasonic waves and diffusing them away from said transmitter, and a sound absorbing material on only the portion of the inner surfaces of the flat walls of said conduit around said transmitting means and around said receiving means and extending sufficiently far along said walls from said means for preventing the generation of standing waves in front of said walls due to the reflection of the said ultrasonic wave.

5. A flow meter as claimed in claim 4 wherein said deflecting reflector has a cone-shaped resonator with the pointed end directed away from said ultrasonic transmitter.

* * * * *